Figures 1, 1A:
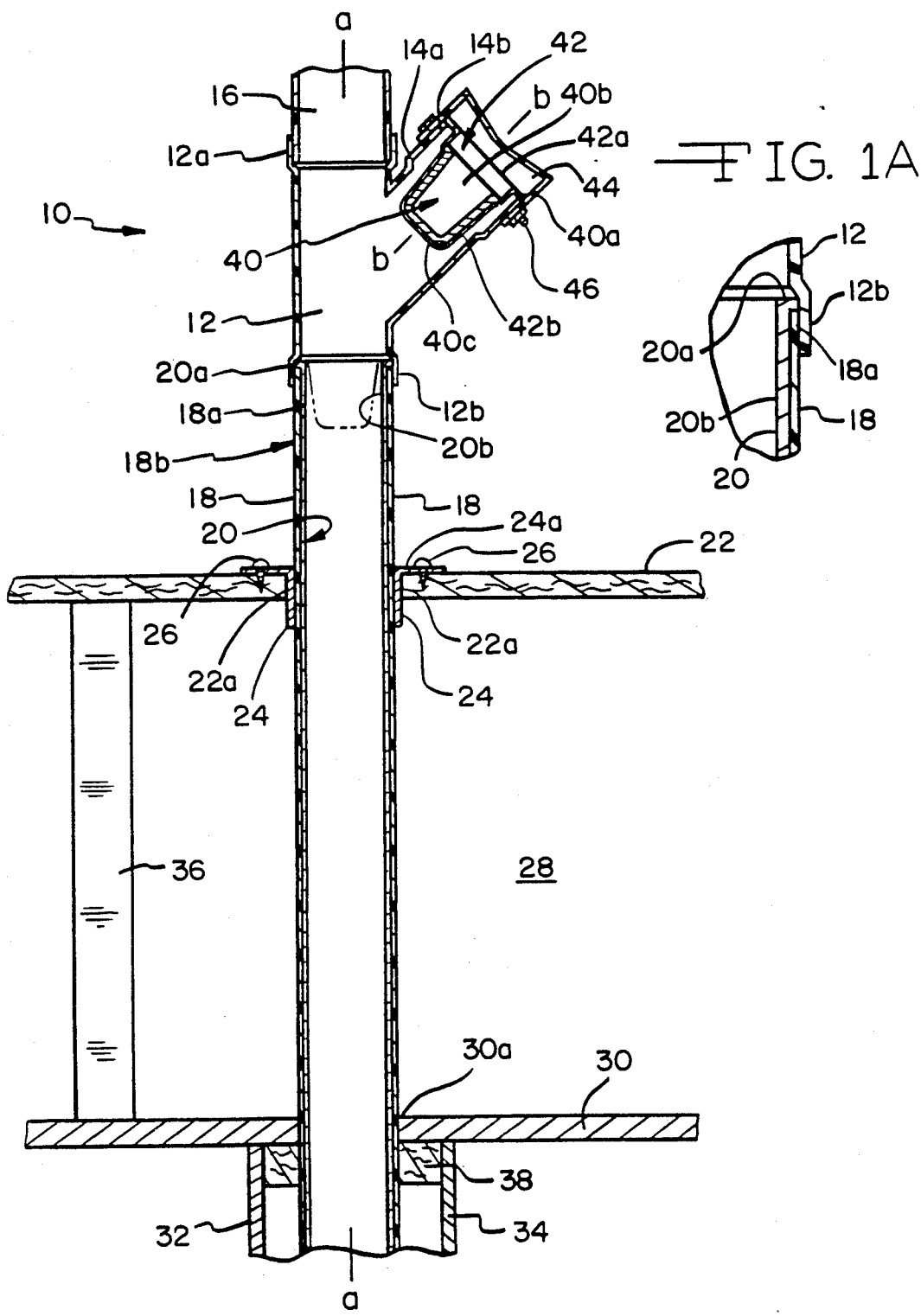

United States Patent [19]
Cornwall

[11] Patent Number: 5,183,070
[45] Date of Patent: Feb. 2, 1993

[54] FIRESTOP DEVICE FOR FLAMMABLE FLOOR CONSTRUCTION

[76] Inventor: Kenneth R. Cornwall, 4963 Springfield Dr., Dunwoody, Ga. 30338

[21] Appl. No.: 692,669

[22] Filed: Apr. 29, 1991

[51] Int. Cl.⁵ ............................................. F16K 17/14
[52] U.S. Cl. ...................... 137/75; 137/362; 52/232
[58] Field of Search .............. 137/72, 74, 75, 362; 52/232

[56] References Cited

U.S. PATENT DOCUMENTS

| | | | |
|---|---|---|---|
| 1,510,813 | 10/1924 | Williams | 137/75 |
| 2,128,292 | 8/1938 | Finn | 137/75 |
| 3,726,050 | 4/1973 | Wise et al. | 137/75 X |
| 4,583,565 | 4/1986 | Cornwall | 137/1 |
| 4,638,829 | 1/1987 | Cornwall | 137/75 |
| 4,724,858 | 2/1988 | Cornwall | 137/75 |

*Primary Examiner*—John Rivell
*Attorney, Agent, or Firm*—Ian C. McLeod

[57] ABSTRACT

An improved firestop stack fitting assembly (10) for use in a building with a floor (22) and a ceiling (30) supported by a floor joist (36), is described. The fitting includes a flammable main conduit (12) mounted on a flammable pipe (18), provided with a non-flammable insert (20) mounted through an opening in the floor. An extension conduit (14) supports a non-flammable plug (40) which is released to fall into and seal off the sleeve and insert when a harness (42) is melted by heat from a fire burning below the ceiling of a lower story or burning in a joist space (28) between the ceiling and the floor to prevent the fire from spreading to an upper story above the floor through the insert. A tee fitting (150) can be optimally mounted in the joist space connected to a pipe (118) mounting an insert (120) and to drain pipe (162) and an extension conduit (164). The fitting assembly prevents the spread of fire and smoke through the insert and main conduit.

22 Claims, 3 Drawing Sheets

FIRESTOP DEVICE FOR FLAMMABLE FLOOR CONSTRUCTION

BACKGROUND OF THE INVENTION (1) Field of the Invention

The present invention relates to an improved firestop assembly for use in buildings which allows penetration of flammable piping through a floor made of sheet material, particularly those made of wood, without creating a firepath through the floor. In particular, the present invention relates to a fitting which includes a plug means for closing the piping. The plug means is activated by heat to seal off a section of the coupling when fire penetrates the pipe in a lower story of a building. The assembly prevents the spread of fire through piping mounted between upper and lower stories in the building. The assembly can be connected to a tee pipe mounted in the joist space defined by the floor joists between the floor and a ceiling in the building. The tee pipe, if non-flammable, helps to prevent the spread of fire through the crawl space and provides a horizontal extension for connection to a water operated fixture or the like.

(2) Prior Art

Flammable pipe penetrations through floors in multistory buildings create a number of problems because a seal between the floors is broken by the pipe. When fire burns through the pipe in a lower story, the fire and smoke can penetrate an upper story because the pipe functions as a chimney. The problem of fire safety when flammable piping penetrates fire rated floors is particularly troublesome, since these openings can jeopardize the fire integrity of the entire building. As a result, in most buildings, plastic (PVC) pipe is not used for these penetrations, since fire can easily penetrate through the floor by burning the pipe. Therefore, a primary problem has been to develop a device which solves the fire safety problem associated with pipe penetrations so that plastic pipe can be used in buildings.

My U.S. Pat. Nos. 4,583,565, 4,638,829 and 4,724,858 show the prior art. U.S. Pat. No. 4,583,565 and 4,638,829 describe firestop fittings with a main conduit and an integral extension conduit mounting a fire releasable plug means made of cast iron or some other non-flammable material. This combination works very well. U.S. Pat. No. 4,724,858 shows a firestop stack fitting for concrete floors wherein the main conduit and the extension conduit are composed of a flammable material connected to a flammable coupling mounted through the concrete floor. A non-flammable sleeve is mounted inside of the main conduit and helps to prevent the spread of fire by sealing off the inside of the main conduit from oxygen. This construction is less expensive and is preferred. There is, however, a need for a firestop stack fitting that helps retard fire and smoke from penetrating through a pipe penetration between stories of a building where the floor and ceiling are made of sheet material supported by floor joists.

OBJECTS

It is therefore an object of the present invention to provide an improved firestop stack fitting assembly for retarding the spread of smoke and fire in a building through a floor made of a sheet material and a ceiling above the floor, supported by a floor joist wherein the main conduit and the extension conduit of the firestop fitting assembly are preferably composed of a flammable material so that the non-flammable parts of the firestop fitting assembly are reduced to a minimum without compromising safety. Further, it is an object of the present invention to provide an improved firestop stack fitting assembly that is mounted on a pipe coupling mounted through a floor and into a joist space in a building for connection to piping such as for water operated fixtures. Further, it is an object of the present invention to provide an improved firestop stack fitting assembly that penetrates through the floor between stories in a building and which is adapted to be connected to a tee pipe for connection to a water operated fixture. Still further, it is an object of the present invention to provide an improved firestop stack fitting assembly which retains the benefits of plastic piping as a building construction material but which is relatively less expensive to manufacture and install. These and other objects will become increasingly apparent by reference to the following descriptions and the drawings.

IN THE DRAWINGS

FIG. 1 is a front, cross-sectional view of a firestop stack fitting assembly 10 of the present invention particularly showing a non-flammable plug 40 and a main conduit 12 and an extension conduit 14 extending from a non-flammable insert 20 mounted inside of a flammable pipe 18 mounted through a floor 22 and a ceiling 30 between stories in a building.

FIG. 1A is an enlarged section of FIG. 1 showing the pipe 18 and the main conduit 12 locking the insert 20 in place.

Figures 2, 2A:
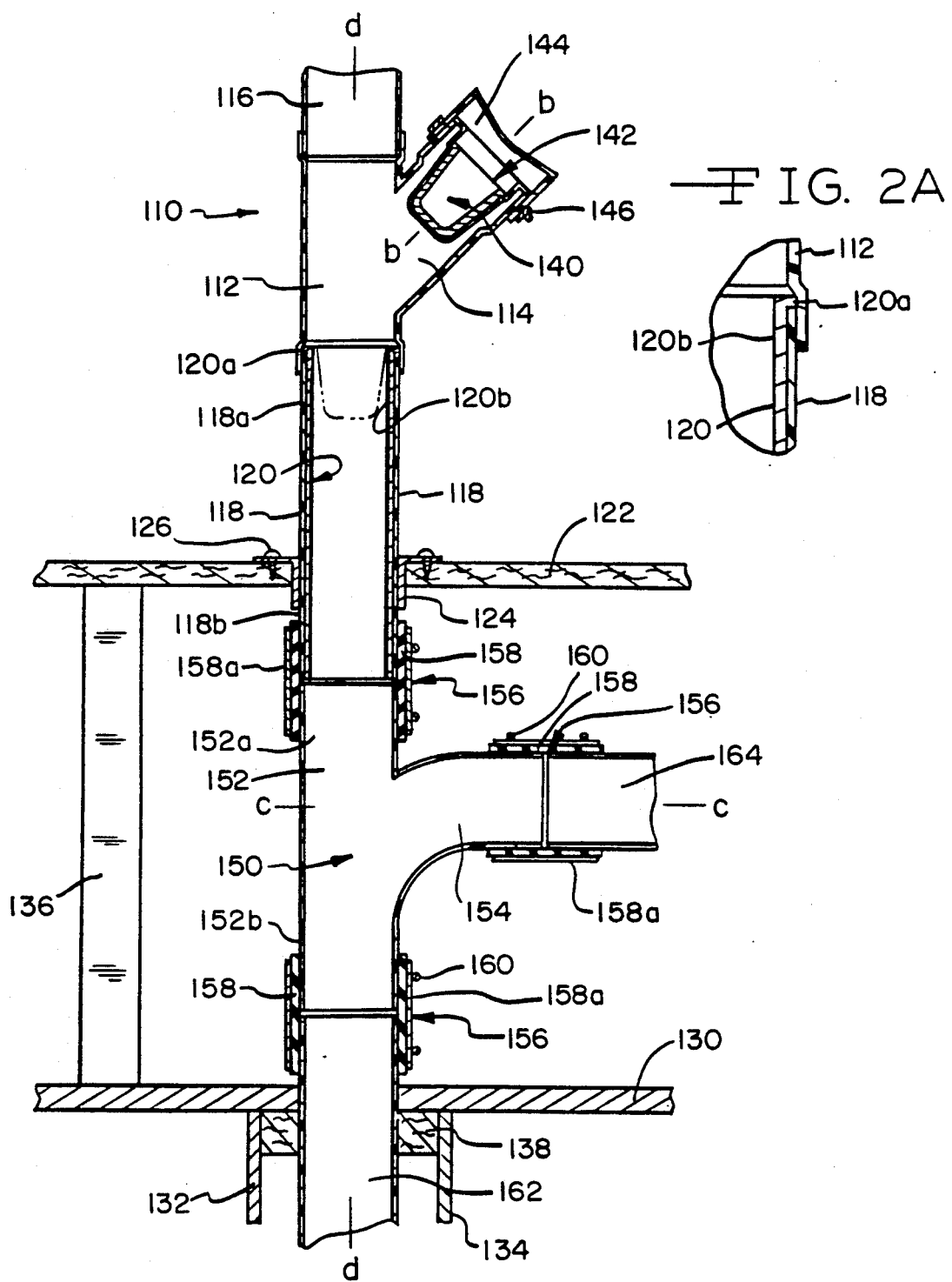

FIG. 2 is a front cross-sectional view of a firestop stack fitting assembly 110 showing a tee pipe 150 mounted below a flammable sleeve 118 and a non-flammable insert 120 with the tee pipe 150 mounted in a joist space 128 between a floor 122 and a ceiling 130 between stories in a building.

FIG. 2A is an enlarged section of FIG. 2 showing the pipe 118 and the main conduit 112 locking the insert 120 in place.

Figures 3, 3A:
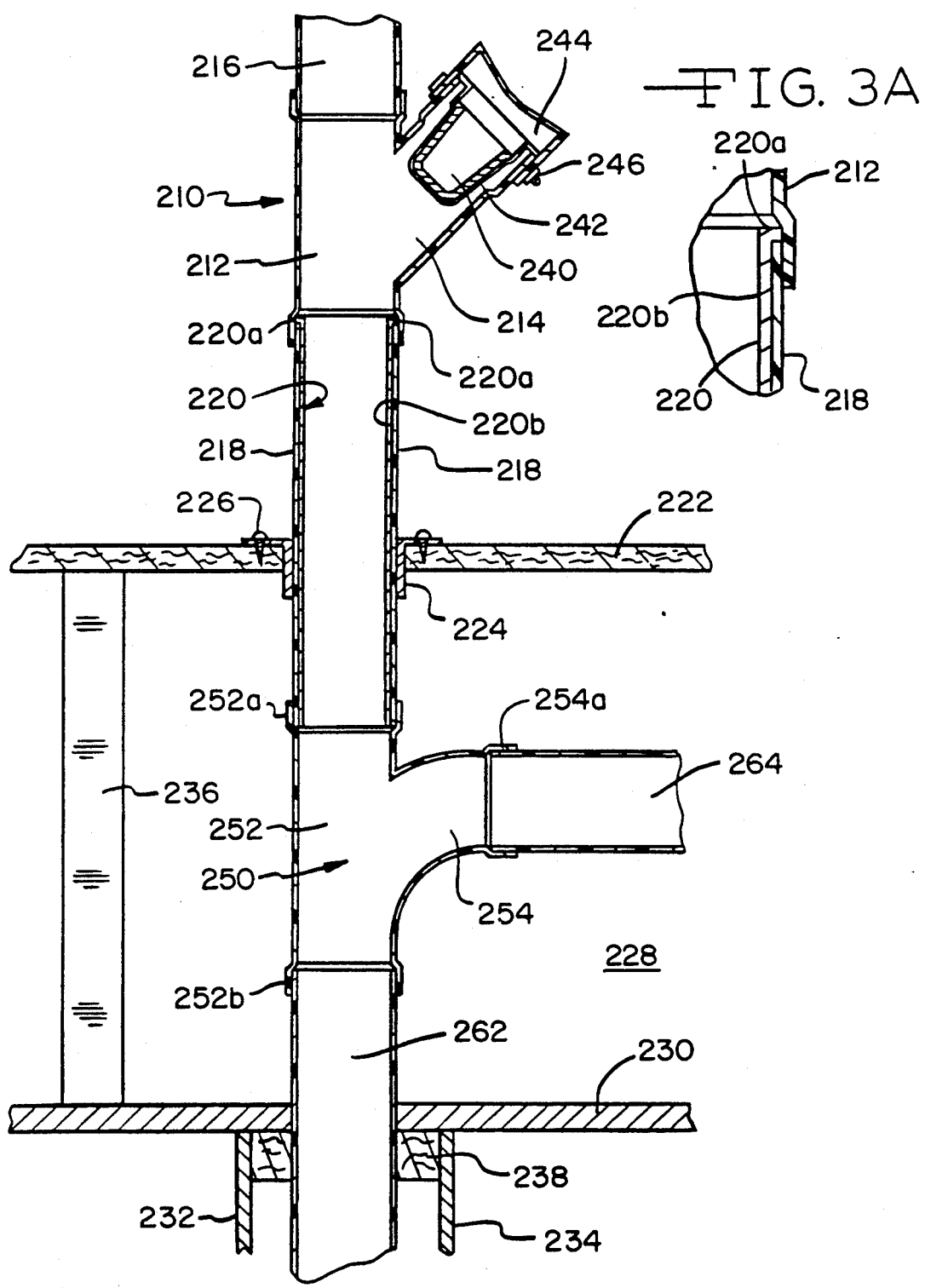

FIG. 3 is a front cross-sectional view of a firestop stack fitting assembly 210 showing a tee pipe 250 mounted in a joist space 228 and depending from a pipe 218 and a non-flammable insert 220, mounted through a floor 222.

FIG. 3A is an enlarged section of FIG. 3 showing the pipe 218 and the main conduit 212 locking the insert 220 in place.

GENERAL DESCRIPTION

The present invention relates to an improved firestop stack fitting assembly which prevents the spread of smoke and fire through a building through an opening in a floor of the building consisting of sheet material mounted on an upper end of floor joists and through a flame resistant ceiling mounted on a lower end of the floor joists below the floor, the stack fitting comprising: a fluid carrying main conduit means having a first longitudinal axis between two opposed openings; an extension conduit means extending from the main conduit means and positioned with a second axis at an acute angle from the longitudinal axis of the main conduit means with an opening; a non-flammable plug means mounted in the extension conduit means on a flammable support means provided in the extension conduit means which plug means is releasable by melting the flammable support means upon exposure of the support means to heat less than necessary for heat destruction of the main and extension conduit means from a fire in the building to thereby move the plug means into the main conduit means; a closure means for the opening of the extension conduit means; a flammable pipe means connected to a lower one of the openings of the main conduit means below the plug means and the extension conduit means, the pipe means having spaced apart openings defining an inner surface and an outer surface of a wall along the first axis of the main conduit means, the pipe means adapted to be mounted through the opening in the floor of the building and through the ceiling below the floor; a non-flammable insert means mounted inside the pipe means and held in place by a retention means, the insert extending from the lower one of the openings in the air conduit through the floor and having spaced apart openings defining an inside diameter along the first axis and having an outside surface of a wall mounted adjacent to the inner surface of the pipe means, wherein a fire in the building is prevented from spreading above the floor through the pipe means mounted through the floor by the insert means which seals off the inner surface of the pipe means from oxygen and by the plug means which releases from the extension conduit means to move into and plug an upper one of the openings of the insert means.

Further, the present invention relates to a building having at least one upper story and at least one lower story with a floor of a sheet material mounted on an upper end of floor joists and a flame resistant ceiling mounted on a lower end of the floor joists below the floor, the building provided with an improved firestop stack fitting assembly which prevents the spread of smoke and fire through the building through an opening in the floor and through the ceiling, the stack fitting comprising: a fluid carrying main conduit means having a first longitudinal axis between two opposed openings; an extension conduit means extending from the main conduit means and positioned with a second axis at an acute angle from the longitudinal axis of the main conduit means with an opening; a non-flammable plug means mounted in the extension conduit means on a flammable support means provided in the extension conduit means which plug means is releasable by melting the flammable support means upon exposure of the support means to heat less than necessary for heat destruction of the main and extension conduit means from a fire in the building to thereby move the plug means into the main conduit means; a closure means for the opening of the extension conduit means; a flammable pipe means connected to a lower one of the openings of the main conduit means below the plug means and the extension conduit means, the pipe means having spaced apart openings defining an inner surface and an outer surface of a wall along the first axis of the main conduit means, the pipe means adapted to be mounted through the opening in the floor of the building and through the ceiling below the floor; a non-flammable insert means mounted inside the pipe means and held in place by a retention means, the insert extending from the lower one of the openings in the air conduit through the floor and having spaced apart openings defining an inside diameter along the first axis and having an outside surface of a wall mounted adjacent to the inner surface of the pipe means, wherein a fire in the building is prevented from spreading above the floor through the pipe means mounted through the floor by the insert means which seals off the inner surface of the pipe means from oxygen and by the plug means which releases from the extension conduit means to move into and plug an upper one of the openings of the insert means.

Except for the insert means and the plug means, the assembly can be made of plastic. The pipe means is preferably vertically mounted through an opening in a floor of an upper story and is connected to a tee pipe mounted in a joist space between the floor of an upper story and a ceiling of a lower story. The tee pipe connects to a drain or down pipe mounted through an opening in the ceiling. An extension of the tee pipe connector connects to a horizontally mounted fluid conduit mounted in the joist space. The horizontally mounted fluid conduit can connect to any number of water operated fixtures. The water operated fixture is preferably a toilet on the upper story and the tee pipe connects the toilet to the drain pipes extending between stories in the building.

SPECIFIC DESCRIPTION

FIG. 1 shows an improved firestop stack fitting assembly 10 of the present invention adapted for connection to vertically oriented drainage pipes between stories in a building. The stack fitting 10 includes a cylindrical main conduit 12 and an integral cylindrical extension conduit 14 at an acute angle between a first longitudinal axis a—a of the main conduit 12 and an axis b—b of the extension conduit 14. The conduits 12 and 14 are made of a flammable material, particularly a plastic material, and are generally in the form of an integral "Y" with collars or enlarged portions 12a, 12b and 14a for attaching pipes or other fittings.

As shown in FIG. 1, vertical pipe 16 is solvent welded to the enlarged portion 12a of the main conduit 12. A plastic pipe 18 with an iron insert 20 is solvent welded to the enlarged portion 12b of the main conduit 12, below the extension conduit 14. An integral annular flange or rim 20a, provided at the upper end 20b of the insert 20, engages the upper end 18a of the pipe 18. The annular rim 20a (FIG. 1A) has an outside diameter along the axis a—a equal to the diameter of an outside wall 18b of the pipe 18 so that when the pipe 18 is solvent welded into the enlarged portion 12b, the insert 20 is locked in place by the pipe 18 and conduit 12.

The pipe 18 is mounted through an opening 22a in a sheet material floor 22 that is usually made of wood. The pipe 18 is mounted in the opening 22a by means of an annular support coupling or bracket 24 with a right angled flange 24a mounted above the floor 22. The support bracket 24 is preferably made of a plastic material, such as PVC, and is solvent bonded to the outside wall 18b of the pipe 18. The flange 24a can be secured to the floor 22 by nails 26, bolts (not shown), glue or other suitable fastening means, or the flange 24a can simply rest against the floor 22, thereby holding the pipe 18 in place.

The pipe 18 and iron insert 20 extend through the floor 22 of an upper story, through a joist space 28 and through a ceiling 30 of a lower story and usually into the space between wall members 32 and 34 between rooms (not shown) in the lower story. A joust or truss 36 is provided in the joist space 28, between the floor 22 and the ceiling 30 and beam or brace 38 is provided between the wall members 32 and 34, adjacent to the point where the pipe 18 and insert 20 penetrate the ceiling 30 through an opening 30a.

FIG. 1 shows a releasable, non-flammable, truncated cone shaped iron plug 40 mounted on a harness 42 in the enlarged portion 14a of the extension conduit 14. The harness 42 rests on a shoulder 14b of the extension conduit 14. The plug 40 is generally hollowed to reduce the weight of the plug 40. The harness 42 acts to release the plug 40 by melting and includes a collar 42a with two integral crossed straps in the shape of an X (only strap 42b shown) depending from the collar 42a. The collar 42a engages a rim or lip 40a at the base end 40b of the plug 40 and a truncated conical apex 40c of the plug is supported by the two crossed straps (only 42b shown). A single strap 42b is as effective and is less expensive than two straps crossed in an X. A single strap 42b will also release the plug 40 sooner upon being subjected to heat from a fire because there is less material to melt. The plug 40 is small enough to pass through the extension conduit 14 when the harness 42 is melted by heat. However, the lip 40a of the plug 40 is large enough in diameter to seal at the top of the insert 20 (dashed lines) adjacent to the annular rim 20a of the insert 20 to plug off the inside of the insert 20 when the harness 42 is melted by a fire. A cap 44 closes the enlarged portion 14a of the extension conduit 14 and is sealed in the extension conduit 14 by a ring clamp 46. Essentially, the mounting of the plug 40 is similar to that shown in my U.S. Pat. Nos. 4,583,565; 4,638,829 and 4,724,858.

FIG. 2 shows another preferred embodiment of a stack fitting assembly 110 of the present invention which is similar to the stack fitting assembly 10 shown in FIG. 1. The stack fitting 110 includes a plastic main conduit 112, an integral extension conduit 114 with a plastic pipe 116 extending from the main conduit 112. A plastic pipe 118 with an iron insert 120 (FIG. 2A) depends from the main conduit 112 and penetrates through a floor 122 of an upper story of a building to an iron tee pipe 150. The insert 120 is locked in the pipe 118 by an annular rim 120a at the upper end 120b of the insert 120 which engages the upper end 118a of the pipe 118, in a manner similar to the embodiment shown in FIG. 1.

An annular support bracket 124 with mounting flange 124a is provided to secure the pipe 118 through an opening 122a in the floor 122. The support bracket 124 is preferably made of a plastic material such as PVC and is solvent welded or bonded to the pipe 118. The flange 124a can be secured to the floor 122 by nails 126, bolts (not shown), glue or other suitable fastening means, or the flange 124a can simply rest against the floor 122 to hold the pipe 118 in place.

The tee pipe 150 is mounted in a joist space 128 between the floor 122 of an upper story and a ceiling 130 of a lower story in a building. The tee pipe 150 includes a main conduit 152 and an integral extension conduit 154 having a longitudinal axis c—c extending at a right angle from the longitudinal axis d—d of the main conduit 154. The conduits 152 and 154 are preferably made of a non-flammable material, preferably cast iron. This helps to prevent any fire that is burning on a story below the tee pipe 150 from spreading through the joist space 128 through the tee pipe 150.

The main conduit 152 of the tee pipe 150 is secured to the bottom of the pipe 118 by a band clamp 156. The band clamp 156 is comprised of a flexible elastomeric or plastic sleeve 158 reinforced with a steel band 158a with a ring clamp 160 mounted in the middle of the sleeve 158.

The procedure for connecting the main conduit 152 of the tee pipe 150 to the pipe 118 or for connecting any two circular cross-sectional conduits or pipes of similar diameters is to first loosen the ring clamp 160 of the band clamp 156 and slide the band clamp 156 over the top of the main conduit 152 until the band clamp 156 is adjacent to the extension conduit 154 of the tee pipe 150. The upper end 152a of the main conduit 152 of the tee pipe 150 is then abutted against the lower end 118b of the pipe 118. The band clamp 156 is next centered over the ends 118b and 152a of the pipe 118 and the conduit 152, respectively. The ring clamp 160 is then tightened onto the sleeve 158 of the band clamp 156, forming a water tight seal between the main conduit 152 and the pipe 118. This type of connection is well known to those skilled in the art. Also, if the conduit 152 and the pipe 118 are made of plastic, they can be joined by solvent welding for added sealing.

A conduit pipe 162 is secured to the lower end 152b of the main conduit 152 of the tee pipe 150 by a band clamp 156 and extends through the ceiling 130 of the lower story, between wall members 132 and 134 between rooms (not shown) in the lower story. Similarly, a conduit pipe 164 is secured to the extension conduit 154 with a band clamp 156. The conduit 164 can be connected to a water operated fixture such as tub connecting pipes (not shown) or a drain (not shown). A joust or truss 136 provides support in the joist space 128 between the floor 122 and the ceiling 130. A support 138 is provided between the wall members 132 and 134, adjacent to and below the ceiling 130.

Should a fire begin to burn in the joist space 128 or below the ceiling 130 of the lower story, a releasable iron plug 140, mounted on a harness 142 in the extension conduit 114 in a manner similar to the plug 40 described in FIG. 1, will release from the extension conduit 114. The plug 140 moves by gravity into the main conduit 112 and seals at the top 120b of the insert 120 (dashed lines). In this manner, the fire and smoke will be prevented from spreading above the floor 122 by traveling through the pipe 118 and insert 120. A cap 144 and ring clamp 146 are provided to close the extension conduit 114.

FIG. 3 shows another embodiment of a firestop stack fitting assembly 210 connected to a pipe 218 having an iron insert 220 mounted in the pipe 218. A plastic tee pipe 250 is connected below the pipe 218 for fluid transmission between stories in a building. The stack fitting 210 comprises a main conduit 212, an extension conduit 214, a releasable plug 240, a harness 242 and a cap 244 with ring clamp 246 for the extension 214. A plastic pipe 216 extends from the main conduit 212 and is secured to the conduit 212 by solvent welding. Similarly to the embodiments shown in FIGS. 1 and 2, the insert 220 is secured in the pipe 218 by an annular flange 220a at an upper end 220b of the insert 220. The plastic pipe 218 is solvent welded or bonded to the conduit 212 of the stack fitting 210 to lock the insert 220 inside the pipe 218 (FIG. 3A).

The pipe 218 is mounted through the floor 222 by an annular flange 224 secured to the floor by nails 226 or other suitable fastening means. A joust or truss 236 is provided in the joist space 228 between the floor 222 and the ceiling 230 and a support 238 is provided between the wall members 232 and 234. The tee pipe 250 is comprised of a main conduit 252 and an extension conduit 254 at a right angle to the main conduit 252. The tee pipe 250 provides for enlarged portions 252a, 252b and 254a. Enlarged portion 252a is adapted for securing the tee pipe 250 to the pipe 218. Enlarged portion 252b is adapted for mounting a vertical conduit 262 to the main conduit 212. Finally, the enlarged portion 254a of the extension conduit 254 mounts a conduit 264 to the extension conduit 254. Since the pipe 218, the tee pipe 250 and the conduits 262 and 264 are made of plastic material, such as PVC, the preferred connection method is by solvent welding or bonding.

IN OPERATION

In operation as shown in FIG. 1, a fire in the room below ceiling 30 will not be able to burn along the pipe 18 because the iron insert 20 greatly reduces the ability of the pipe 18 to propagate a fire. Also, any potential firepath through the inside of the insert 20 will be blocked by the plug 40. When the heat from the fire becomes sufficient to melt the harness 42, the plug 40 moves into and through the main conduit 12 with the lip 40a of the plug sealing at the upper end 20b of the insert 20 adjacent to the annular rim 20a (dashed lines). Thus, the firestop stack fitting assembly 10, in conjunction with the pipe 18 and iron insert 20, prevents the spread of smoke and fire through the opening 22a in floor 22 and through the opening 30a in the ceiling 30.

The firestop stack fitting assemblies 110 and 210 in FIG. 2 and 3 work in a similar manner as the firestop stack fitting assembly 10. In FIG. 2, a non-flammable tee pipe 150, preferably made of iron, is mounted below the pipe 118 and insert 120 of the fitting 110. The tee pipe 150 prevents fire in the room below the ceiling 130 from spreading any farther than the flammable pipe 162. The tee pipe 150 also helps to prevent a fire in the joist space 128 from burning any farther than the pipe 164 and spreading to the story above the floor 122 through the pipe 150. As was explained in FIG. 1, the insert 120 keeps the fire from burning along the pipe 118 while the plug 140 releases when the harness 142 melts to plug off the inside of the insert 120 (dashed lines).

The firestop stack fitting assembly 210 in FIG. 3 works in a similar manner as the fitting 110 in FIG. 2 except that a fire burning on a lower story below ceiling 230 or in the joist space 228 will be able to burn along the plastic pipes 262 and 264 and through the plastic tee pipe 250. The fire will not be able to spread any farther, however, without actually burning through the floor 222. The iron insert 220 contains the fire and keeps it from burning along the pipe 218 while the releasable plug 240 lodges adjacent to the annular flange 220a of the insert 220 (dashed lines) and blocks any firepath through the pipe 218 and insert 220. This prevents the fire from "jumping" through the insert 220 to the plastic main conduit 212 of the stack fitting 210 mounted in the upper story.

It will be appreciated that the plugs 40, 140 and 240 can have any shape although the truncated cone shape is preferred. The plugs 40, 140 and 240 could be round for instance. The essential feature is that the plugs 40, 140 and 240 mate together with the inserts 20, 120 and 220 sufficiently to provide the fire seal.

Numerous variations will occur to those skilled in the art. It is intended that the foregoing description be only illustrative of the present invention and that the present invention be only limited by the hereinafter appended claims.

I claim:

1. An improved firestop stack fitting assembly which prevents the spread of smoke and fire through a building and through an opening in a floor of the building consisting of sheet material mounted on an upper end of floor joists and through a flame resistant ceiling mounted on a lower end of the floor joists below the floor, the stack fitting comprising:
    (a) a fluid carrying main conduit means having a first longitudinal axis between two opposed openings;
    (b) an extension conduit means extending from the main conduit means and positioned with a second axis at an acute angle from the longitudinal axis of the main conduit means with an opening;
    (c) a non-flammable plug means mounted in the extension conduit means on a flammable support means provided in the extension conduit means which plug means is releasable by melting the flammable support means upon exposure of the support means to heat less than necessary for heat destruction of the main and extension conduit means from a fire in the building to thereby move the plug means into the main conduit means;
    (d) a closure means for the opening of the extension conduit means;
    (e) a flammable pipe means connected to a lower one of the openings of the main conduit means below the plug means and the extension conduit means, the pipe means having spaced apart openings defining an inner surface and an outer surface of a wall along the first axis of the main conduit means, the pipe means adapted to be mounted through the opening in the floor of the building and through the ceiling below the floor;
    (f) a non-flammable insert means mounted inside the pipe means and held in place by a retention means, the insert extending from the lower one of the openings in the main conduit through the floor and having spaced apart openings defining an inside diameter along the first axis and having an outside surface of a wall mounted adjacent to the inner surface of the pipe means, wherein a fire in the building is prevented from spreading above the floor through the pipe means mounted through the floor by the insert means which seals off the inner surface of the pipe means from oxygen and by the plug means which releases from the extension conduit means to move into and plug an upper one of the openings of the insert means.

2. The fitting of claim 1 wherein the main conduit means and the pipe means are comprised of plastic and are solvent welded or bonded together.

3. The fitting of claim 1 wherein the main conduit means and extension conduit means are integral, each having a circular internal cross-section, wherein the flammable pipe means and the non-flammable insert means have a circular cross-section, and wherein the plug means is shaped as a cone with a base and with a truncated apex positioned towards the main conduit means and wherein upon release the plug means moves into and plugs the upper one of the openings of the insert means to close the opening.

4. The fitting of claim 3 wherein the plug means has an annular rim adjacent the base having a diameter slightly smaller than an internal diameter of the extension conduit means and larger than the inside diameter of the insert means and wherein when the plug means is released by the support means, the plug means moves into the insert means with the rim of the plug means plugging the upper one of the openings of the insert means and with the apex of the plug means facing a lower one of the openings of the insert means.

5. The fitting of claim 1 wherein the retention means is a flange means provided at the upper one of the openings of the insert means, the flange means having a diameter larger than a diameter of the inner surface of the pipe means for mounting the insert means inside of the pipe means.

6. The fitting of claim 5 wherein the lower one of the openings of the main conduit means has an enlarged diameter portion so that the upper one of the openings of the pipe means is mounted inside the enlarged portion of the main conduit means for connecting the pipe means to the main conduit means with the flange means of the insert means around the upper one of the openings of the pipe means between the main conduit means and the pipe means which locks the insert means inside the pipe means.

7. The fitting of claim 6 wherein the main conduit means and the pipe means are made of plastic and are solvent welded or bonded together to lock the insert means inside the pipe means.

8. The fitting of claim 1 wherein the flammable support means is provided by a low melting temperature plastic harness means with a strap upon which the plug means rests.

9. The fitting of claim 8 wherein the harness means is attached to the extension conduit means adjacent to the opening of the extension conduit means.

10. The fitting of claim 9 wherein the harness means is mounted in an enlarged portion of the extension conduit means adjacent to the closure means for the opening of the extension conduit means.

11. The fitting of claim 9 wherein the opening of the extension conduit means is spaced from the main conduit means.

12. The fitting of claim 1 wherein a lower one of the openings of the pipe means includes a tee pipe means.

13. The fitting of claim 12 wherein the tee pipe means is comprised of a tee pipe main conduit means having an upper opening and a lower opening along the first longitudinal axis of the main conduit means and a tee pipe extension means having an opening along a second axis at an angle to the first longitudinal axis of the main conduit means and the tee pipe main conduit means, wherein the opening of the tee pipe extension means is connected to an extension conduit means by a first connector means and wherein the upper one of the openings of the tee pipe main conduit means is connected to the lower one of the openings of the pipe means by a second connector means with the lower one of the openings of the tee pipe main conduit means connected to a drain conduit means by a third connector means.

14. The fitting of claim 13 wherein the tee pipe means is mounted in a joist space between the floor of an upper story and the ceiling of a lower story in the building and wherein the first, second and third connection means are provided by a steel reinforced band clamp means.

15. The fitting of claim 14 wherein the tee pipe means is flammable.

16. The fitting of claim 14 wherein the tee pipe means is non-flammable.

17. The fitting of claim 16 wherein the non-flammable tee pipe means is made of cast iron.

18. The fitting of claim 15 wherein the tee pipe means and the pipe means are made of plastic which are solvent welded or bonded together.

19. The fitting of claim 13 wherein the tee pipe means is mounted in the joist space between the floor of the upper story and the ceiling of the lower story and wherein there are enlarged portions at the openings of the tee pipe main conduit means and at the opening of the tee pipe extension means of the tee pipe means with the upper one of the openings of the tee pipe main conduit means connected to the lower one of the openings of the pipe means and with the lower one of the openings of the tee pipe main conduit means connected to a drain conduit means and with the opening of the tee pipe extension means connected to an extension conduit and wherein the tee pipe means, the pipe means, the drain conduit means and the extension conduit means are all made of plastic and each of the connections is by solvent welding or bonding.

20. The fitting of claim 1 wherein the floor is made of a flammable material and wherein the ceiling is made of a flame resistant material.

21. The fitting of claim 1 wherein a second fluid conduit means is connected to the upper one of the openings of the main conduit for providing drainage in an upper story of the building to a lower story.

22. A building having at least one upper story and at least one lower story with a floor of a sheet material mounted on an upper end of floor joists and a flame resistant ceiling mounted on a lower end of the floor improved firestop stack fitting assembly which prevents the spread of smoke and fire through the building through an opening in the floor and through the ceiling, the stack fitting comprising:
(a) a fluid carrying main conduit means having a first longitudinal axis between two opposed openings;
(b) an extension conduit means extending from the main conduit means and positioned with a second axis at an acute angle from the longitudinal axis of the main conduit means with an opening;
(c) a non-flammable plug means mounted in the extension conduit means on a flammable support means provided in the extension conduit means which plug means is releasable by melting the flammable support means upon exposure of the support means to heat less than necessary for heat destruction of the main and extension conduit means from a fire in the building to thereby move the plug means into the main conduit means;
(d) a closure means for the opening of the extension conduit means;
(d) a closure means for the opening of the extension conduit means;
(e) a flammable pipe means connected to a lower one of the opening of the main conduit means below the plug means and the extension conduit means, the pipe means having spaced apart openings defining an inner surface and an outer surface of a wall along the first axis of the main conduit means, the pipe means adapted to be mounted through the opening in the floor of the building and through the ceiling below the floor;
(f) a non-flammable insert means mounted inside the pipe means and held in place by a retention means, the insert extending from the lower one of the openings in the main conduit through the floor and having spaced apart openings defining an inside diameter along the first axis and having an outside surface of a wall mounted adjacent to the inner surface of the pipe means, wherein a fire in the building is prevented from spreading above the floor through the pipe means mounted through the floor by the insert means which seals off the inner surface of the pipe means from oxygen and by the plug means which releases from the extension conduit means to move into and plug an upper one of the openings of the insert means.

* * * * *

UNITED STATES PATENT AND TRADEMARK OFFICE
CERTIFICATE OF CORRECTION

PATENT NO.   : 5,183,070
DATED        : February 2, 1993
INVENTOR(S)  : Kenneth R. Cornwall It is certified that error appears in the above-indentified patent and that said Letters Patent is hereby corrected as shown below:

Column 4, line 63, "joust" should be --joist--.

Column 6, line 28, "joust" should be --joist--.

Column 6, line 62, "joust" should be --joist--.

Column 10, Claim 22, line 22 after "floor" and line 23, before "improved" the following should be inserted --joists below the floor, the building provided with an--.

Column 10, Claim 22, lines 43 and 44, "(d) a closure means for the opening of the extension conduit means;" should be deleted (printed twice).

Signed and Sealed this

Thirtieth Day of November, 1993

Attest:

BRUCE LEHMAN

Attesting Officer

Commissioner of Patents and Trademarks